3,723,141
INFRARED TRANSMISSIVE LEAD BISMUTHATE GLASSES
William H. Dumbaugh, Jr., 6 E. Chatfield Place, Painted Post, N.Y. 14870
Filed Mar. 22, 1971, Ser. No. 126,798
Int. Cl. C03c 3/00
U.S. Cl. 106—47 R                                     4 Claims

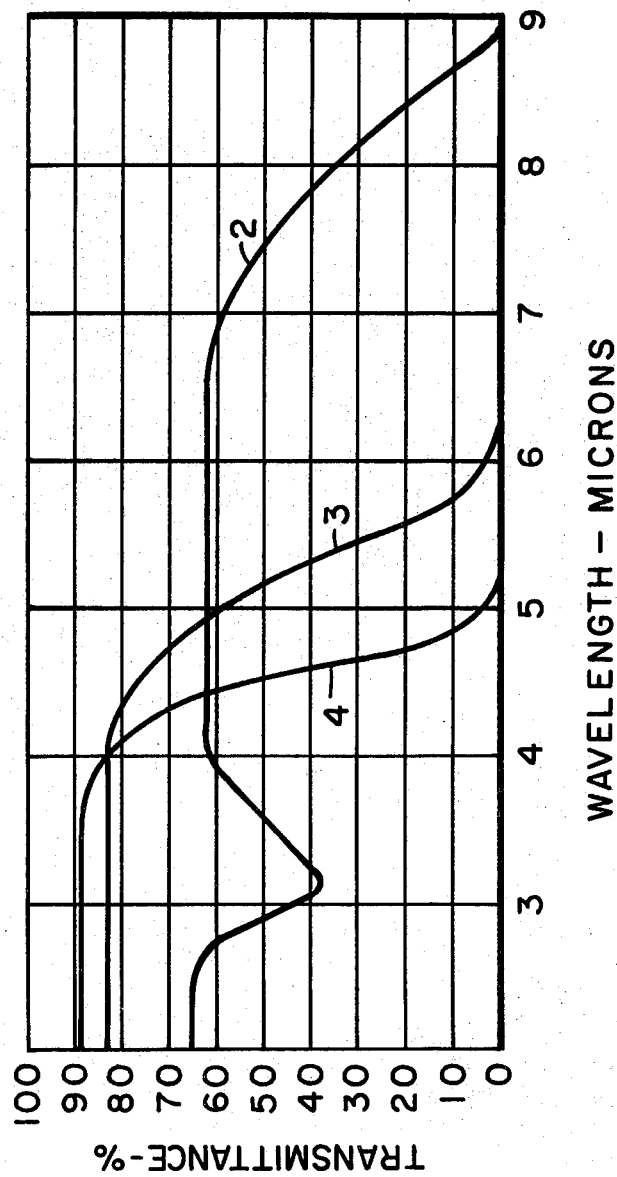

ABSTRACT OF THE DISCLOSURE

A combination of barium and zinc oxides is used to stabilize infrared transmitting lead bismuthate glasses. The resulting glasses contain 10–85% $Bi_2O_3$, 10–75% PbO, 2–25% BaO, 1–10% ZnO and 0–20% of miscellaneous other oxides.

---

The invention relates to lead bismuthate glasses that have exceptionally high infrared transmission characteristics, particularly at wavelengths beyond six microns. It is particularly concerned with a method of stabilizing such glasses without seriously impairing their infrared transmitting characteristics.

Detection systems based on sensitivity to infrared or heat radiation are well known. The detection device in such a system normally requires an infrared transmitting glass cover. This may take the form of either a flat window or a hollow dome depending on the device construction.

Such covers are presently produced from special silicate or germinate glasses. However, covers or similar articles formed from these glasses in practical thicknesses have a characteristic cutoff in the range of 4.5 to 5.5 microns and do not transmit radiations longer than six microns in wavelength.

Chalcogenide glasses may have useful transmission characteristics at longer wavelengths. However, these glasses are quite susceptible to surface deterioration in use. Further, they cannot normally be melted without the melt being insulated from the atmosphere during the melting process. Therefore, there is a distinct need for glasses that can be melted and handled in normal manner and that will also provide substantial transmission at wavelengths beyond six microns.

U.S. Pat. No. 3,531,304, granted to H. Bromer et al. on Sept 29, 1970, discloses infrared transmitting glasses composed primarily of at least two oxides selected from the oxides of tungsten, molybdenum, bismuth, and arsenic, the balance being selected from the oxides and fluorides of Mg, Ca, Sr, Ba, and Pb. The patent shows that these glasses do not transmit to an appreciable extent beyond a wavelength of six (6) microns, their cutoff being within the 5–6 micron range.

Lead bismuthate type glasses have previously been proposed for the production of optical elements wherein a high refractive index is of particular importance. Specifically, U.S. Pat. No. 2,853,393, granted Sept. 23, 1958 to Beck and Taylor, discloses high index, transparent optical elements containing (1) at least 75% by weight of at least two oxides of the group $Bi_2O_3$, PbO, $Tl_2O_3$, $WO_3$, $Ta_2O_5$, and CdO, (2) at least 40% $Bi_2O_3$ and/or PbO, and (3) 0 to 10% of strong glass forming oxides such as $SiO_2$ and $B_2O_3$. These optical elements are characterized by refractive indices of at least 2.1 and high optical dispersion values, and are described as useful in producing reflecting beads.

U.S. Pats. No. 2,726,161 (granted Dec. 6, 1955 to Beck and Taylor), No. 2,870,030 (granted Jan. 20, 1959 to Stradley and Beck) and No. 2,790,723 (granted Apr. 30, 1957 to Stradley and Beck) each relate to similar high index glass elements employing a different glass base. Respectively, they relate to elements produced from bismuth titanate, bismuth oxide, and lead titanate base glasses.

The present invention is based in part on my discovery that the wavelength range over which a lead bismuthate type glass has a substantial infrared transmission is phenomenally long. More specifically, I have found that this type of glass may transmit at wavelengths well beyond six microns, that a transmission on the order of 80% may be obtained at a wavelength of six microns, and that a transmission as high as 60% may be obtained at 8 microns.

It is, however, difficult to produce glasses composed essentially of lead and bismuth oxides. As noted in the prior art, lead bismuthate melts have a strong tendency to devitrify or crystallize on cooling so that the glassy state is not achieved. Additives may of course be used to inhibit this tendency, and such practice is commonly referred to as stabilization of a glass.

The strong glass forming oxides tend to stabilize lead bismuthate melts and thereby produce glasses containing substantial amounts of lead and bismuth oxides. However, even minor amounts of these strong glass forming oxides also tend to sharply restrict the infrared transmission. Thus, there is a problem of stabilizing a lead bismuthate type glass without drastic loss of infrared transmission.

I have found that the oxides of barium and zinc, if used together and in sufficient amount, stabilize lead bismuthate glasses with only a relatively small detrimental influence on infrared transmission. However, I have further found that these oxides are not equivalents. This means that one oxide cannot completely replace the other. Rather, both must be present to effect the desired glass stabilization by inhibition of crystallization. The present invention is further based on these additional discoveries regarding glass stabilization with a minimized loss of infrared transmission.

The invention then is a method of stabilizing an infrared transmitting, lead bismuthate glass by including in the batch from which the glass is melted a compound of barium and a compound of zinc in such amounts as to provide 2 to 25% BaO and 1 to 10% ZnO by weight in the glass composition. It further comprises an infrared transmitting glass stabilized in this manner which consists essentially in weight percent on an oxide basis of 10 to 85% $Bi_2O_3$, 10 to 75% PbO, the total $Bi_2O_3$+PbO being at least 60%, 2 to 25% BaO and 1 to 10% ZnO. The glasses may contain up to 20% optional oxides, but the total content of $SiO_2$+$B_2O_3$+$P_2O_5$, if any, must be less than 1%.

At least 10% each of lead oxide (PbO) and bismuth oxide ($Bi_2O_3$) must be present for glass forming purposes, and the total content of these two oxides must be at least 60%. These oxides are the basic contributors to infrared transmission so that their content should normally be as high as is feasible. However, it has not been found practical to produce glasses containing over about 85% $Bi_2O_3$ or 75% PbO.

As noted, both barium oxide (BaO) and zinc oxide (ZnO) must be present for stabilization purposes. At least one percent ZnO plus at least two percent BaO is required for this purpose. I find that optimum results are achieved with 2–7% ZnO and 4–20% BaO. With larger amounts the stabilizing influence diminshes and is essentially lost at amounts over 10% ZnO or 25% BaO.

A particular feature of the present invention is the relatively small apparent effect that either ZnO or BaO have on infrared transmission. Thus, the characteristic transmission capabilities beyond six microns are retained in the presence of these oxides and appear to change only slightly as their content is varied.

Oxides other than the four essential oxides already mentioned have not been found to improve infrared transmission. Also, except for the strong glass formers, these oxides exert little or no stabilizing effect beyond that provided by the essential BaO plus ZnO addition. Nevertheless, the addition of such other oxides for secondary purposes may be desirable and is contemplated within the scope of the invention.

Particularly any oxide other than $SiO_2$, $B_2O_3$ or $P_2O_5$ may, under favorable circumstances, be employed individually in amounts up to ten percent by weight, and collectively in amounts up to 20% by weight. In particular, the colorant or transition metal oxides, the alkali metal oxides, CaO, SrO, CdO, HgO, $Tl_2O$, $TiO_2$, $GeO_2$, $Sb_2O_3$ and $As_2O_3$ have been successfully added either individually or in combination.

The strong glass forming oxides $SiO_2$, $B_2O_3$ and $P_2O_5$ have a strong depressing effect on infrared transmission beyond six microns. Accordingly, they should generally be avoided, and their total content must be maintained below one percent in any event.

The present glasses may be melted in any conventional manner at temperatures in the range of 900° C. at 1000° C. However, melting in an electrically heated, platinum container has been found convenient. While various salts and other compounds may be used, it is preferred to mix the glass batch from reagent grade oxides in the interest of purity and property control.

Because of their relatively unstable nature, the glasses are preferably chilled rapidly from the molten state. The glass may be cast in desired shape, ground and polished, or otherwise finished in known manner, depending on the form of article required.

Table I below sets forth several exemplary batches from which glasses in accordance with the invention have been melted. These batch compositions are set forth in parts by weight on an oxide basis. It will be appreciated that, since the batches are composed of oxides, glasses melted therefrom have the same calculated composition in percent by weight, and approximately the same analyzed composition.

In several cases, a disc suitable for infrared transmission measurements on a Perkin Elmer Model 221 Recording Spectrophotometer was cast from the glass melt. In these cases, the percent transmission, as measured at six and eight microns, is shown as percent $T_6$ and percent $T_8$, respectively, in the table. The measured thickness ($t$) of the disc is shown in mm.

TABLE I

| Example | 1 | 2 | 3 | 4 | 5 | 6 | 7 | 8 |
|---|---|---|---|---|---|---|---|---|
| $Bi_2O_3$ | 61.8 | 40.2 | 34.6 | 82.1 | 17.8 | 35.2 | 38.4 | 36.7 |
| PbO | 26.9 | 44.4 | 50.0 | 10.5 | 62.5 | 45.2 | 52.5 | 35.1 |
| BaO | 7.4 | 11.4 | 11.4 | 3.6 | 15.6 | 15.5 | 7.2 | 24.0 |
| ZnO | 3.9 | 4.0 | 4.0 | 3.8 | 4.1 | 4.1 | 1.9 | 4.2 |
| $t$ (mm.) | 0.2 | 1.6 | 1.5 | | | 0.9 | 0.3 | |
| Percent $T_6$ | 52 | 80 | 80 | | | 83 | 63 | |
| Percent $T_8$ | 30 | 26 | 30 | | | 55 | 58 | |

A glass melted from Example 1 was found to have a refractive index of 2.5 as measured at 589 millimicrons. A glass melted from Example 2 had a density of 7.879 grams/cc.

Table II illustrates the manner in which small amounts of various optional constituents may be included in the new glasses. An oxide batch corresponding to composition 1 above was selected as a base. A series of modified batch compositions was then formulated by successively substituting, on a mole percent basis in the base batch, one or more additive oxides for one of the basic oxide components. The resulting batches, in percent by weight on an oxide basis, are shown, together with transmission data and sample thickness of glasses melted from certain of the batches.

TABLE II

| Example | 1 | 9 | 10 | 11 | 12 | 13 | 14 |
|---|---|---|---|---|---|---|---|
| $Bi_2O_3$ | 61.8 | 61.7 | 50.0 | 61.7 | 61.5 | 61.5 | 56.4 |
| PbO | 26.9 | 26.8 | 26.5 | 26.9 | 26.8 | 26.8 | 27.0 |
| BaO | 7.4 | 7.4 | 3.7 | 7.4 | 7.4 | 7.4 | 7.4 |
| ZnO | 3.9 | 3.9 | 3.9 | 3.9 | 3.9 | 3.9 | 3.9 |
| $B_2O_3$ | | 0.2 | | | | | |
| $GeO_2$ | | | 2.5 | | | | |
| $Li_2O$ | | | | 0.1 | | | |
| $TiO_2$ | | | | | 0.4 | | |
| $MnO_2$ | | | | | | 0.4 | |
| $Tl_2O$ | | | 5.1 | | | | 5.3 |
| CdO | | | 3.1 | | | | |
| HgO | | | 5.2 | | | | |
| $t$ (mm.) | 0.2 | 2.0 | 3.0 | 2.0 | | | 1.0 |
| Percent $T_6$ | 52 | 15 | 56 | 46 | | | 60 |
| Percent $T_8$ | 30 | 5 | 33 | 19 | | | 30 |

The sharp depressing effect of the strong glass formers is shown in Example 9 wherein it is seen that transmission is sharply reduced by as little as 0.2% by weight $B_2O_3$. However, Example 10 shows that $GeO_2$ does not behave as $SiO_2$ and $B_2O_3$ in this respect, and hence may be employed. Example 10 also demonstrates that a substantial amount of certain additives can be tolerated in combination.

The significant characteristic of the glasses of the invention is their phenomenal infrared transmission. To further illustrate this, a one mm. ground and polished glass disc was prepared from a melt of Example 14. The infrared transmission of the disc was measured on a Perkin Elmer Model 221 Recording Spectrophotometer. The measured curve is shown as curve 2 in the graphical representation of the accompanying drawing. In this drawing, percent transmission (percent T) is plotted on the vertical axis, while transmitting wavelengths in microns are plotted on the horizontal axis.

For comparison, corresponding measurements were made on a commercial, germanate type, infrared transmitting glass. These are shown as curve 3 in the drawing. Coresponding measurements were also made on a commercial, silicate type, infrared transmitting glass and these are shown as curve 4.

It will be observed that the present glass transmits appreciably to a wavelength beyond nine microns. Further, it has a transmission of at least 50% at 7.5 microns, whereas the presently available commercial glasses fall to zero transmission in 5 to 6 micron range.

The critical stabilizing effect of BaO and ZnO in combination is illustrated by a comparison of four oxide melts. The batches were formulated to provide (1) a batch with both BaO and ZnO in accordance with the invention, (2) one with only BaO, (3) one with only ZnO, and (4) one with neither BaO or ZnO. The batches are shown in the following table in cation percent to better illustrate their composition relationship:

TABLE III

| Example | 1 | 15 | 16 | 17 |
|---|---|---|---|---|
| $BiO_{1.5}$ | 55 | 68.75 | 61.11 | 61.11 |
| PbO | 25 | 31.25 | 27.78 | 27.78 |
| ZnO | 10 | | 11.11 | |
| BaO | 10 | | | 11.11 |

Each of the batches was melted and then rapidly chilled in an effort to produce a glass. The melt of Example 1, the batch of Example 1 in Tables I and II also, produced a glass having properties described earlier. The melts of Examples 15, 16 and 17 each produced a completely crystallized mass.

I claim:
1. A glass capable of transmitting substantial amounts of infrared radiation at wavelengths longer than 6 microns which consists essentially, by weight on the oxide basis, of 10–85% $Bi_2O_3$, 10–75% PbO, the total

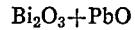

being at least 60%, 2–25% BaO, 1–10% ZnO, and wherein the total content of $SiO_2+B_2O_3+P_2O_5$ is less than 1%.

2. A glass in accordance with claim 1 also containing at least one of the following oxides in amounts not exceeding 10% individually and 20% collectively: CaO, SrO, CdO, HgO, $Tl_2O_3$, $TiO_2$, $GeO_2$, $Sb_2O_3$, $As_2O_3$, the transition metal oxides, and the alkali metal oxides ($R_2O$).

3. A glass in accordance with claim 1 wherein the BaO content is 4–20%.

4. A glass in accordance with claim 1 wherein the ZnO content is 2–7%.

References Cited

UNITED STATES PATENTS 2,853,393 9/1958 Beck et al. _____ 106—47 R
2,726,161 12/1955 Beck et al. _____ 106—47 R L. DEWAYNE RUTLEDGE, Primary Examiner
W. R. SATTERFIELD, Assistant Examiner U.S. Cl. X.R.
106—47 Q